(No Model.)
E. A. FALES.
PROCESS OF MAKING AMMONIUM SULPHATE.
No. 318,972. Patented June 2, 1885.
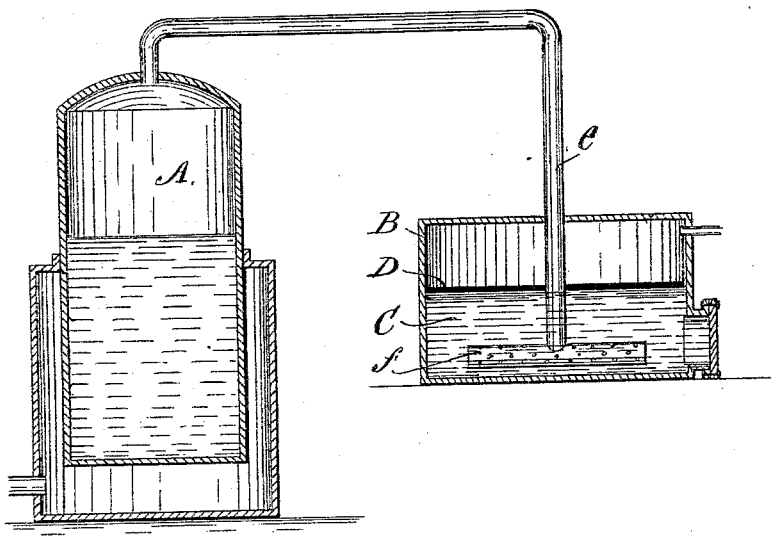
Witnesses:
H. J. Moore
V. M. Hood
Inventor:
Edward A. Fales
By H. P. Hood
Atty.

UNITED STATES PATENT OFFICE.

EDWARD A. FALES, OF INDIANAPOLIS, INDIANA.

PROCESS OF MAKING AMMONIUM SULPHATE.

SPECIFICATION forming part of Letters Patent No. 318,972, dated June 2, 1885.

Application filed February 16, 1885. (No specimens.)

*To all whom it may concern:*

Be it known that I, EDWARD A. FALES, a citizen of the United States, residing at Indianapolis, in the county of Marion and State of Indiana, have invented a new and useful Improved Process for Making Sulphate of Ammonia, of which the following is a specification.

My invention relates to an improved process for making sulphate of ammonia from ammoniacal liquor, a by-product in the manufacture of coal-gas.

The object of my improvement is to prevent discoloration of the sulphate of ammonia.

The ordinary and well-known process of making the above-mentioned salt is as follows: The ammoniacal liquor is distilled and the vapor is passed through dilute sulphuric acid in a suitable receiver, the crystals forming on the bottom of the receiver.

It frequently occurs that the crystals of sulphate of ammonia, which should be white, are found to be injured in appearance by dark discolorations. I have discovered that by putting into the receiver with the sulphuric acid a small quantity of coal-tar sufficient to cover the surface of the acid (the tar being lighter than the acid and floating thereon) the crystals of sulphate of ammonia are uniformly white and all discoloration is avoided.

The accompanying drawing illustrates my process. The figure represents a sectional view of the apparatus.

A is the retort in which the ammoniacal liquor is distilled. B is the receiver; C, the sulphuric acid, and D the coal-tar; $e$, the pipe through which the ammonia vapor passes to the bottom of the receiver to be discharged through the perforated branch $f$.

I believe the said result to be due to the more volatile portions of the coal-tar, as the solid or pitchy portion of the tar is found in a continuous mass in the receiver after the process is ended.

I claim as my invention—

That improvement in the process of making sulphate of ammonia which consists in passing the vapor arising from the distillation of ammoniacal liquor through sulphuric acid covered with a layer of coal-tar, substantially in the manner specified.

EDWARD A. FALES.

Witnesses:
L. S. FALES,
H. P. HOOD.